No. 793,676.

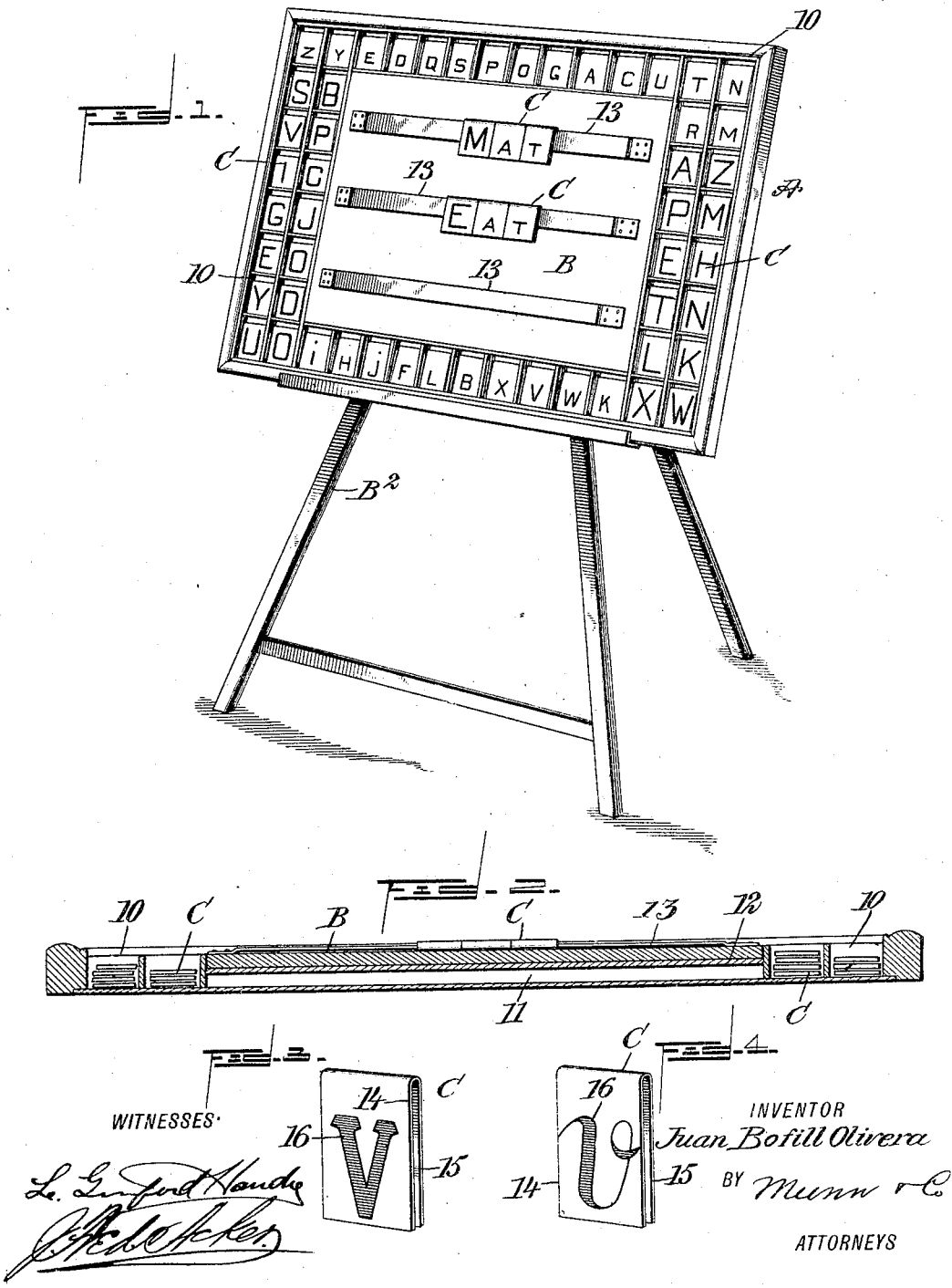

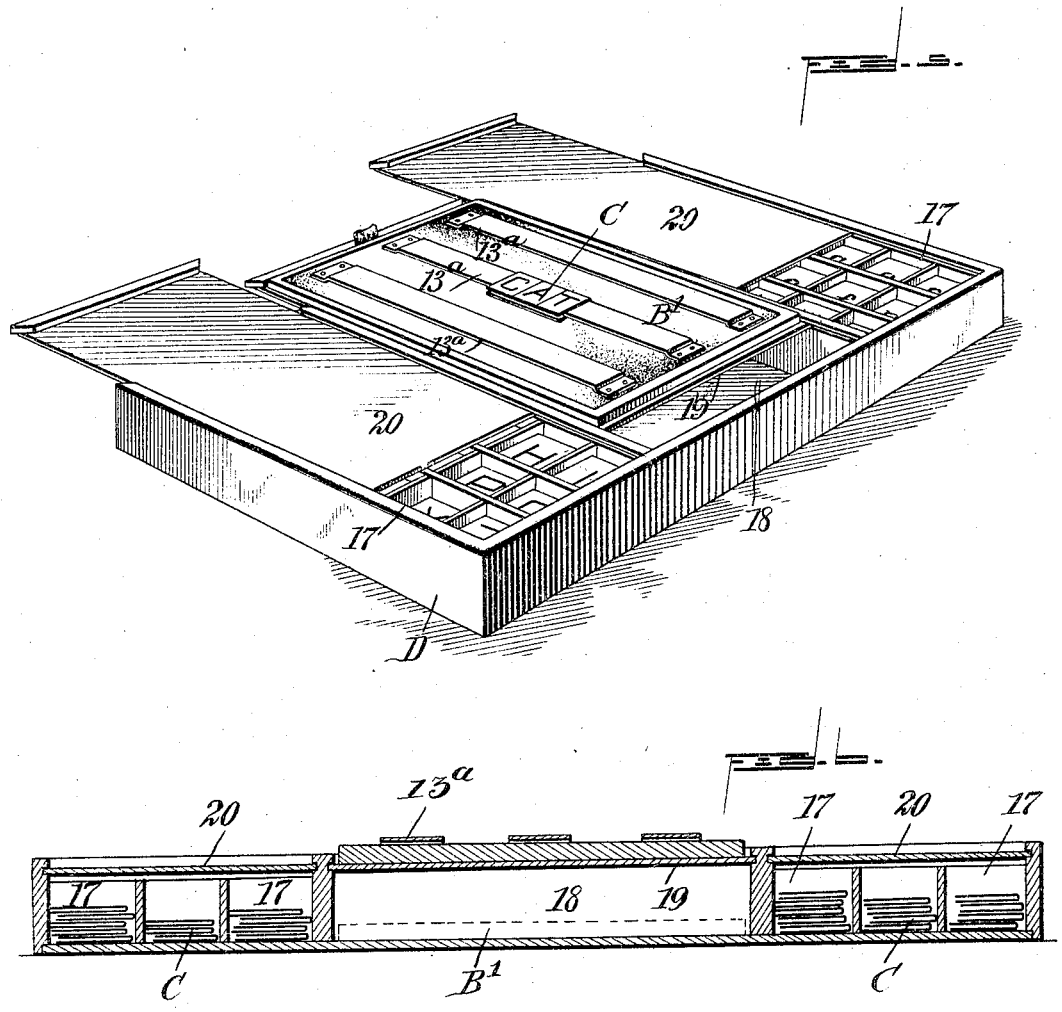

Patented July 4, 1905.

UNITED STATES PATENT OFFICE.

JUAN BOFILL OLIVERA, OF MATANZAS, CUBA.

EDUCATIONAL DEVICE.

SPECIFICATION forming part of Letters Patent No. 793,676, dated July 4, 1905.

Application filed August 3, 1904. Serial No. 219,319.

*To all whom it may concern:*

Be it known that I, JUAN BOFILL OLIVERA, a citizen of the Republic of Cuba, and a resident of Matanzas, in the Province of Matanzas, Cuba, have invented a new and useful Improvement in Educational Devices, of which the following is a full, clear, and exact description.

The purpose of this invention is to provide a means whereby children or students may not only familiarize themselves with the letters of the alphabet, but may arrange these letters in words or a series of words, and whereby the device may be placed on the desk of each student and a similar device be employed by the instructor to give pupils the initial idea of the grouping of letters to form words, leaving the pupils to themselves afterward to spell out the different words.

A further purpose of the invention is to make a device of the character described in a very simple, comprehensible, and economic manner and to provide members capable, for example, of having capital letters on one side and small letters on the opposite side, such devices being so formed that they may be made to straddle supports in the form of lines, so that when a number of said devices are placed on the line-supports words may be spelled out, thus familiarizing the young student with the words of a language and at the same time instructing him in the formation of letters, large and small, in both Roman and script.

Another purpose of the invention is to provide a complete case in which the demonstrating device or line-support may be conveniently packed away and quickly brought into position for use and in which the various demonstrating devices may be placed in proper order in the said case, so that any one demonstrating device may be quickly taken out to be applied to the main demonstrating device or line-support.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of a device used for educational purposes and adapted to be fitted to an easel to demonstrate a lesson before a class. Fig. 2 is an enlarged transverse section taken through the device from end to end. Fig. 3 is a perspective view of one of the demonstrating members of the device, showing one face. Fig. 4 is a corresponding view illustrating the opposing face. Fig. 5 is a perspective view of the device especially adapted for use by the pupil; and Fig. 6 is a transverse section of the device shown in Fig. 5, taken from side to side of the device, said section being taken on an enlarged scale.

A represents a frame, which is shown mounted on an easel $B^2$ in order that the contents of the frame may be readily displayed to the pupils in a class. This frame A is provided with series of marginal chambers 10 and with a central main chamber 11, and a slide 12 is located in said chamber 11 between its rear and its front portions, as best shown in Fig. 2. In connection with this chamber 11 and slide 12 a demonstrating-board B is employed, which when not in use is located in the chamber 11, being concealed by the slide 12.

When the demonstrating-board B is in use, it is placed upon the outer face of the slide 12, as is shown in Figs. 1 and 2, and on the outer face of the demonstrating-board B offset rails 13 are secured, offset from the demonstrating-board practically from one end to the other, and these rails 13 are preferably arranged in parallel order one above the other, as is shown in Fig. 1.

Each chamber 10 is adapted to contain any desired number of demonstrating members C. (Shown in detail in Figs. 3 and 4.) These demonstrating members are usually made of metal with an outer covering of paper, celluloid, or the like; but any approved material may be employed in their construction. The material of these demonstrating members C is bent upon itself to form two opposing parallel sections 14 and 15, connected at the top and separated at the bottom, and on the outer face of the section 14, for example, a capital letter is produced either in Roman type, script, or italics, and upon the outer face of the opposing member 15 the corresponding small letter for the capital letter on the member 14 is produced in any approved manner.

The demonstrator having placed the frame A, provided with the demonstrating members, on the easel B², and, further, having placed the demonstrating-board B in position on the frame, the demonstrator can then proceed and illustrate to the class the formation of capital and small letters and bring the letters into position to spell words, simple or complex, and in placing the demonstrating members in position on the demonstrating-board the rails 13 are received between the sections 14 and 15 of the said members.

In Fig. 5 I have illustrated a case D, especially adapted for desk use by a pupil, so that pupils by its use can follow a demonstrator and afterward form words for themselves. In the form of case D series of compartments 17 are produced at each side edge of the said case within the same, and each compartment contains any desired number of demonstrating members C having large and small letters produced on opposite faces, and between the side compartments 17, containing the demonstrating members, a main compartment 18 is provided corresponding to the compartment 11 in the case A and normally closed by a slide 19, on which slide a demonstrating-board B' is mounted when in use. Otherwise the said board is contained within the compartment 18. This demonstrating-board B' is provided with rails 13ª, arranged in the same order and similarly offset to the rails 13 used in connection with the demonstrating-board B. (Illustrated in Figs. 1 and 2.) The various compartments 17 at the side portions of the desk-case D are closed when the device is not in use by means of suitable sliding covers 20.

This device for educational purposes is very simple. It is durable and very effective, as the large and the small letters of the alphabet by its use may be impressed on the minds of young children, and by arranging the various demonstrating members on the tracks of the demonstrating-board a pupil is enabled to study at leisure the character of the letters, and as he progresses the pupil in placing the letters may learn to form words.

Having thus described my invention, I claim as new and desire to secure by Letters Patent—

1. In an educational device, a display-board, rails secured to the said display-board and offset therefrom, and demonstrating members, U-shaped in cross-section, which members straddle the rails, being detachable therefrom and having movement on the rails, the said demonstrating members having characters thereon.

2. In an educational device, a cabinet having a series of marginal compartments and a central main compartment and a board removably fitted in the said main compartment, rails secured to one face of the said board, the said rails being offset from the board between their ends, and demonstrating members U-shaped in cross-section, having characters on their side faces, the said demonstrating members being removably and slidably mounted on the said rails, the marginal compartments in the cabinet receiving the demonstrating members when removed from the rails.

In testimony whereof I have signed my name to this specification in the presence of two subscribing witnesses.

JUAN BOFILL OLIVERA.

Witnesses:
J. FRED. ACKER,
JNO. M. RITTER.